United States Patent [19]

Dietachmair

[11] Patent Number: 4,671,942
[45] Date of Patent: Jun. 9, 1987

[54] MIXING PISTOL

[76] Inventor: Herbert Dietachmair, Lindauer Strasse 46, Hörbranz, Austria

[21] Appl. No.: 675,874

[22] Filed: Nov. 28, 1984

[30] Foreign Application Priority Data

Dec. 13, 1983 [DE] Fed. Rep. of Germany ....... 3345049

[51] Int. Cl.⁴ .......................... B01F 5/04; B01F 15/02
[52] U.S. Cl. .................. 422/133; 134/22.18; 134/24; 366/138; 422/135
[58] Field of Search .......... 422/131, 133, 135; 134/22.18, 24; 366/138, 150

[56] References Cited

U.S. PATENT DOCUMENTS

| | | | |
|---|---|---|---|
| 3,102,004 | 8/1963 | Grintz | 422/133 |
| 3,222,134 | 12/1965 | Peterson | 422/133 |
| 3,450,388 | 6/1969 | Stump | 422/135 |
| 4,302,550 | 11/1981 | Pisaric et al. | 422/133 |
| 4,314,963 | 2/1982 | Boden et al. | 422/133 |
| 4,510,120 | 4/1985 | Bauer | 422/133 |

Primary Examiner—Barry S. Richman
Assistant Examiner—William R. Johnson
Attorney, Agent, or Firm—Paul H. Gallagher

[57] ABSTRACT

The mixing pistol for reactive multiple component materials includes a self rotating mixing rotor in a mixing chamber, and several valves controling the injection of a component into the mixing chamber. Additionally there are valves for the injection of cleansing solution and compressed air. While cleansing the mixing chamber, in order not to have to remove the used cleansing solution by way of the outlet of the mixing pistol, which would be connected with the removal of dangerous and harmful fumes and gases, there is an additional outlet valve arranged at the mixing chamber by means of which the removal of the used cleansing solution is accomplished. The cleansing solution is driven in the mixing chamber in a closed circulation and never comes into contact with the outer region of the mixing pistol.

3 Claims, 1 Drawing Figure

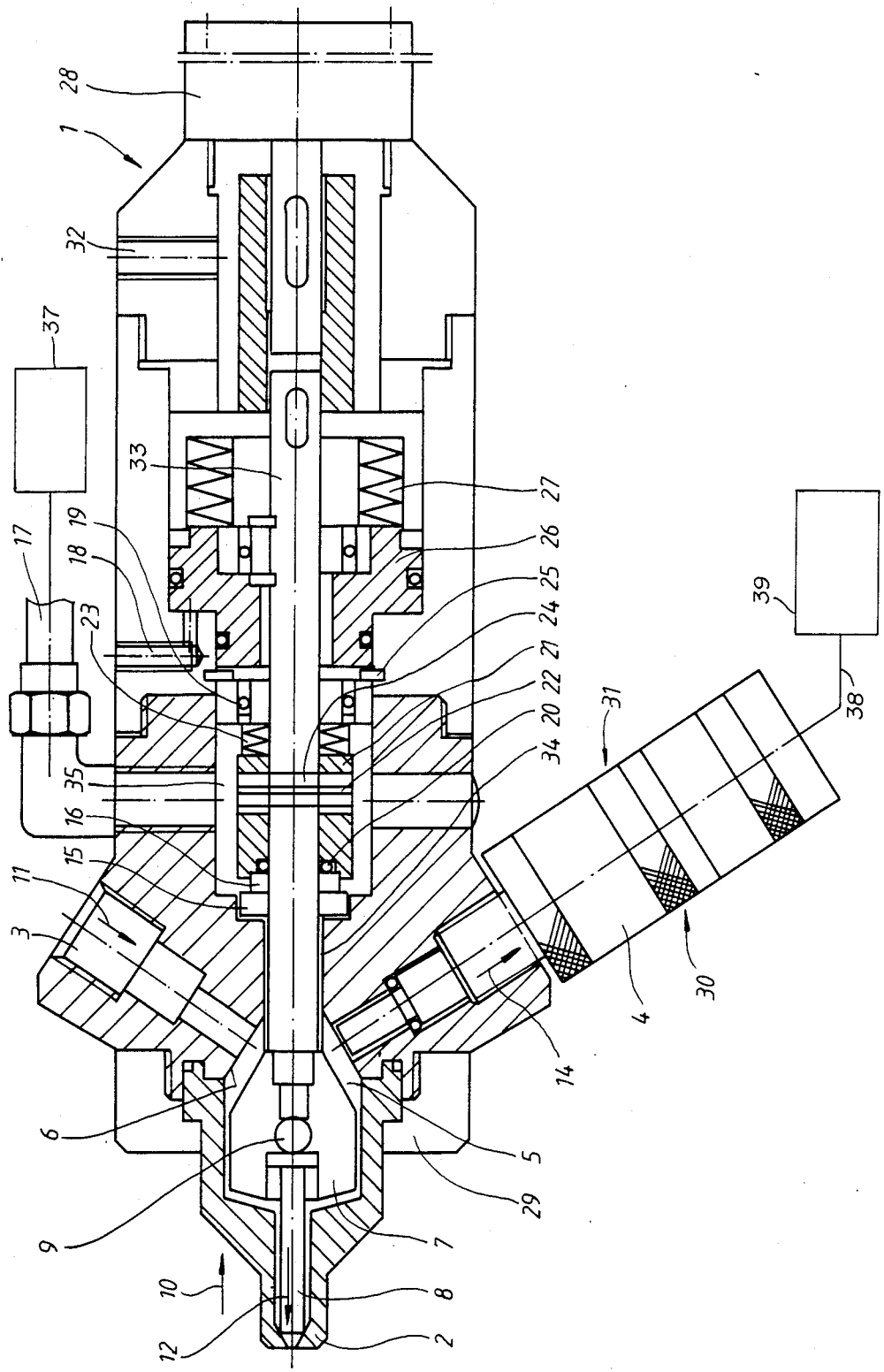

MIXING PISTOL

The invention concerns a mixing pistol for reactive multiple component materials, for example, polynol, isocynate, silicon, epoxy-rosin, plumbiferous colors and the like, having a mixing chamber and a rotating mixing rotor therein, and into which several valves are directed for the injection of a desired component into the mixing chamber and for injection of cleansing solution and compressed air thereinto.

The invention further concerns a procedure for the cleansing of this mixing pistol.

Mixing pistols for reactive multiple component materials are known. In the use of previously known types, when the work process is interrupted, cleansing solution is directed into the mixing chamber, under pressure if necessary, and the soiled cleansing solution then proceeds out through the outlet nozzle, through which the processed material usually also flows, into a suitable container.

Such types involve the disadvantage that in processing reactive multiple components, under some circumstances, poisonous fumes result, so that the processing is either very dangerous, and for the safety of the operators, extensive exhaust ventilation must be provided.

There is also a certain environmental danger that results therefrom, in that when these fumes are sucked out, they reach the outside air where they can cause harm.

A further disadvantage with such previously known types, is that the soiled cleansing solution is so strongly concentrated with the multiple component materials, that its re-use or separation into cleansing solution and material is not possible; on the other hand, a solidifying effect does not take effect to enable one to safely store the cleansing fluid with the debris therein.

The present invention makes possible a simple means and method whereby quick and effective cleaning can be performed without any environmental damage, or endangering the operators, and in addition, through recycling, the soil materials can be separated from each other and re-used.

The solution of the problem according to the invention consists in providing an additional outlet valve from the mixing chamber for the removal of the used cleansing solution.

The mixing chamber is no longer washed through, so to speak, but instead, the outlet through which the material is sprayed is closed; the cleansing solution is injected, under pressure if necessary, into the mixing chamber for a sufficiently long period of time that such pressure increase is attained that a certain concentration of the cleansing solution with the residue material is attained. This pressure increase, which can be made adjustable, effects the opening of an additional outlet valve, establishing a passage into an extra container, into which the soiled cleansing material flows.

In a modified form, the outlet valve for the soiled cleansing solution, instead of being opened by excess pressure in the mixing chamber, is time controlled. When, for example, the cleansing solution rotates for one or two minutes in the mixing chamber with the mixing rotor, after the lapse of this time, the outlet valve is opened and the soiled cleansing solution is let out.

With both forms there is the advantage that in this extra container only soiled cleansing fluid is found, and the degree of concentration thereof is controllable. The process can be described, so to speak, as a preliminary round in the insertion of the mixing component into an extra container. With this foremixing or preliminary round, components are inserted long enough so that the heavy material that sinks reaches a desired composition or is sufficiently mixed.

This material, which is now sufficiently mixed, produces no environmental danger.

In order to conform the pressure proportions to the different viscosities, it is a further characteristic of the invention that the outlet valve has an adjustable outlet cross section, for example, an adjustable closing cone.

It is also essential that the mixing chamber has elements, for example, guiding surfaces, for a circulation of the cleansing solution.

Also, with this design it is now possible with the use of the smallest amount of cleansing solution to achieve the greatest cleansing effect.

Devices heretofore known, included rear cuts or corners that are disadvantageous to a smooth flow, so that in cleansing the mixing chamber by flushing cleansing solution through them, excessively large amounts of cleansing solution was often required, in order to clean them.

Greater expenditure was also involved, especially when cleansing solutions were used which produced harmful fumes. A mixing chamber constructed so that first the cleansing solution circulates, and there are no projections, etc., in the shadow of the flow, very little cleansing solution is required, and in a short time the mixing chamber is cleansed.

It is further essential that an interposition trunk is provided between the additional outlet valve and a recycling container.

In contrast to previously known devices, the soiled cleansing solution in the present case, is now no longer conducted into an open container, and also expensive exhaust ventilation need not be provided, but extra containers are used in which one can adjustably produce mixing proportions of cleansing solution and separable material, which are determined according to the pressure proportions of the mixing chamber.

It is also important that the exit opening of the valve for the cleansing fluid is so arranged that a circulation of the cleansing agent in the mixing chamber takes place.

In the present case, one can dispense with additional mechanical devices for producing circulation; the influx direction is so chosen that solely through this influx direction, circulation is established in the mixing chamber.

As opposed to the previously known forms for cleaning the mixing chamber, the present invention utilizes a different chronological sequence of the operating steps Proceeding from the construction for cleaning the mixing chamber of a mixing pistol with an exit nozzle, by means of injecting a pressure driven, cleansing solution, and draining the soiled solution out of an exit, the following steps are taken:
1. First the outlet nozzle is closed, then
2. A cleansing solution is conducted into the mixing chamber in an effective circulation, and
3. The outlet valve is opened by means of the higher pressure in the mixing chamber, which pressure arises from the viscosity of the mixing of the cleansing solution in proportion to the reactive material.

It has proved to be expedient, that the mixing chamber is constructed cone-shaped and the mixing rotor is shaped complementally to that form.

The object of the invention does not consist merely of that of the indicated patent claims, rather also of the combination of the patent claims together.

All of the specifications and characteristics disclosed herein, especially the physical construction presented in the drawings, are claimed as essential to the invention, individually and in combination with respect to the state of development in the field.

In the following, the invention is treated in more detail with reference to the drawing which is a representative form of construction.

The mixing pistol 1 consists of a cylindrical shaped foundation body on the rear end of which is a compressed air motor 28 having an axially extending flange fitted to the foundation body, the motor with its drive shaft being connected to the drive shaft 33 of the mixing pistol. The connection between the two shafts is made by a bushing, in which the drive shaft 33 of the mixing pistol is axially pushable. By means of an adjusting member 32, at the housing of the mixing pistol, the speed of the mixing rotor 7 can be reduced, the mixing motor being securely connected with the drive shaft 33. The drive shaft has ball bearing support in a lifting piston 26, which is front loaded by means of a pressure spring 27. In response to control air being provided by means of a control air accession 18 to the front side of the lifting piston 26, the piston and the drive shaft 33 will be axially pushed towards the back, whereby the closing piston 8 that closes the outlet 2 of the mixing pistol is pulled back and the multiple component material is forced in the direction of the arrow 12 through the outlet 2. In this step the closing piston 8 moves towards the rear in the direction of the arrow 10.

Adjacent to a perpendicular ring 25 an additional ball bearing 19 is provided, fixed in the housing of the mixing piston 1. A pressure spring 23 bears against the ball bearing 19, which is part of a safety valve. The safety valve consists of a pressure piece 21 that can be axially pushed on the drive shaft 33, which (pressure piece) under the influence of the pressure spring 23, is pressed against a rotating disk 16, which is engaged by an O-ring 20. The rotating disk 16 presses on a disk 15 that is securely pressed in at the housing of the mixing pistol. With excess pressure in the mixing chamber 5 of the mixing pistol 1, the material in the mixing chamber escapes by way of the bore 34 and lifts off rotating disk 16 from the secure disk 15 against the force of the pressure spring 23, whereby the material flows into the bore 35, which is of increasing diameter, and from there it is led out into a recycling container 37 by way of the safety valve 17.

The pressure piece 21 is, by means of a pin 22, axially movably held on the drive shaft, since the pin 22 is held in a groove 24 of greater axial extent.

The mixing rotor 7 is securely connected with the drive shaft 33.

The inner end of the closing piston 8 presses, through the ball 9, on the front end of the drive shaft 33. The ball 9 provides a rotation support so that the closing piston 8 remains stationary during the revolution of the mixing rotor 7.

Only by way of example, five valves are provided at the circumference of the mixing pistol, but for the sake of simplicity one single valve is shown in the under part of the illustration, and also, in the upper part, only the graduated bore for the insertion of the inlet valve 3 is provided.

The valves referred to, e.g., five, have varying functions. There are, for example, two medium valves, in order to conduct, when desired, a component of the material into the mixing chamber 5. There is further the inlet valve 3 for the injection of cleansing solution. Preferably opposite the inlet valve 3 there is provided an outlet valve 4 for the flow of the used cleansing solution from the mixing chamber 5. There is additionally (not shown) an air valve provided, with which the cleansed mixing chamber is blown dry.

The illustration includes, as already presented, only the inlet valve 3 for the injection of the cleansing solution and the outlet valve 4 for the removal of the used cleansing solution, while the medium valve, and the air valve are not shown.

After completion of the mixing process, that is, after production of a reactive multiple component material, the mixing pistol 1 is ready for the delivery of this material through the outlet 2. By means of the control air, as controlled by the member 18, the lifting piston 26 is moved backwards in the direction of the arrow 10, whereby the drive shaft 33 is pushed towards the rear, and the closing piston 8 lifts off from the mouth of the outlet 2, whereby the multiple component material that was introduced into the mixing chamber 5, is sprayed through the outlet 2 in the direction of the arrow 12. The necessary spray pressure is regulated by means of the feeding pressure of both the medium valves.

In interrupting, or ending, the operating process, the mixing chamber 5 is cleansed according to the invention procedure. The medium valves are closed and the inlet valve 3 is opened, while the outlet valve 4 is closed, whereby the cleansing solution is injected into the mixing chamber in the direction of the arrow 11, and the mixing rotor 7 is rotated simultaneously. By reason of the cone shaped surface of the mixing chamber 5 with a cone shaped portion 6 arranged in the rear region, a continuous mixing through and rotation of the cleansing solution takes place in the mixing chamber 5, whereby the mixing rotor 7, which also has a cone shaped portion at the rear side, strongly enhances the rotation of the cleansing solution.

After the cleansing solution has circulated for a while in the mixing chamber 5, with a running mixture rotor 7, the time-controlled outlet valve 4 is opened, and thereby the closing piston lifts off from its O-ring tight seating, and the used cleansing solution is let out in the direction of the arrow 14 by way of the boring 31.

At the boring 31 an interposition trunk 38 is connected to a recycling container 39, thereby avoiding harmful environmental danger by development of dangerous fumes or gases.

The total spray head of the mixing piston 1 is removable and is held with a screw cap 29 at the housing of the mixing pistol 1.

Instead of controlling the outlet of the used cleansing solution through the outlet valve 4 by means of a time control, it is also possible to utilize a pressure control. This would be produced (in a way not illustrated in detail) by increased pressure in the outlet valve 4, which by exceeding a certain predetermined amount, opens and lets the used cleansing solution flow through the boring 31.

During the operation of the mixing pistol, the mixing rotor 7 rotates at a rate of about 5,000 revolutions per minute.

I claim:

1. A mixing pistol for the mixing of reactive components comprising, a body having means defining a longitudinal central axial hole therein with means defining a first outlet opening through a front end of the body, the axial hole including means defining an enlarged mixing chamber adjacent the front end of the body, a rotatable shaft mounted in the axial hole and having limited axial slidable movement, a mixing rotor mounted on the shaft and positioned in the mixing chamber, and a closing piston attached to a forward end of the shaft for closing said first outlet opening, first spring means yieldingly biasing the shaft forwardly, and the shaft when moved forwardly moving the closing piston to a closed position, a first inlet means for conducting compressed air radially into the axial hole for moving the shaft rearwardly against the first spring means, and the shaft when moved rearwardly enabling the closing piston to move rearwardly and exposing the first outlet opening, at least one second inlet means, each with a first valve means, for injecting mixing fluids into the mixing chamber, safety outlet means leading from the axial hole radially through the body for release of high pressure fluid, at least one second outlet means, each with a second valve means, for conducting mixing fluids out of the mixing chamber wherein each of said second inlet means and second outlet means are directly connected to said mixing chamber, a third valve means in the hole movable forwardly to a position closing the mixing chamber from the safety outlet means, and second spring means biasing the third valve means forwardly, and a motor for driving the rotatable shaft.

2. A mixing pistol according to claim 1 wherein, the second valve means comprises pressure-controlled means for enabling flow of cleansing fluid therethrough.

3. A mixing piston according to claim 1 wherein, the second valve means includes time-controlled means for enabling flow of cleansing fluid therethrough.

* * * * *